(12) United States Patent
Berruet et al.

(10) Patent No.: US 9,790,818 B2
(45) Date of Patent: Oct. 17, 2017

(54) MECHANICAL SYSTEM FORMING A CAM FOLLOWER OR A ROCKER ARM, INJECTION PUMP OR VALVE ACTUATOR COMPRISING SUCH A MECHANICAL SYSTEM AND METHOD FOR MANUFACTURING SUCH A MECHANICAL SYSTEM

(71) Applicants: Nicolas Berruet, Artannes sur Indre (FR); François Champalou, Chaumont-sur-Loire (FR); Samuel Viault, Saint-Antoine-du-Rocher (FR)

(72) Inventors: Nicolas Berruet, Artannes sur Indre (FR); François Champalou, Chaumont-sur-Loire (FR); Samuel Viault, Saint-Antoine-du-Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 91 days.

(21) Appl. No.: 14/945,631

(22) Filed: Nov. 19, 2015

(65) Prior Publication Data

US 2016/0153321 A1 Jun. 2, 2016

(30) Foreign Application Priority Data

Nov. 27, 2014 (EP) .................................... 14306908

(51) Int. Cl.
*F01L 1/14* (2006.01)
*F01L 1/18* (2006.01)
(Continued)

(52) U.S. Cl.
CPC .................. *F01L 1/18* (2013.01); *F01L 1/14* (2013.01); *F01L 1/146* (2013.01); *F02M 59/102* (2013.01);
(Continued)

(58) Field of Classification Search
CPC ........... F01L 1/14; F01L 1/18; F01L 2105/02; F02M 59/102
(Continued)

(56) References Cited

U.S. PATENT DOCUMENTS 4,231,267 A 11/1980 Van Slooten
6,289,765 B1 9/2001 Clayson, III

FOREIGN PATENT DOCUMENTS

DE 102012211852 A1 1/2014
EP 615056 A1 9/1994
(Continued)

*Primary Examiner* — Ching Chang
(74) *Attorney, Agent, or Firm* — Bryan Peckjian; SKF USA Inc. Patent Dept.

(57) ABSTRACT

A mechanical system that forms a cam follower or a rocker arm. The mechanical system includes a support element, a pin extending between two opposite ends along a first axis, and a roller mounted on the pin, movable in rotation relative to the pin around the first axis and adapted to roll on a cam. The support element further comprises an insert having holding members supporting the pin ends, provided with cut-outs having a shape complementary to the shape of the pin-ends, for assembling pin with insert by quarter-turn around the first axis. The pin ends each have a flat surface and an external surface. A first dimension of each pin end, measured perpendicularly to the flat surface, between the flat surface and the external surface of the pin end, is higher than half the outer diameter of the pin ends.

17 Claims, 3 Drawing Sheets

(51) Int. Cl.
*F02M 59/10* (2006.01)
*F16H 53/06* (2006.01)

(52) U.S. Cl.
CPC .......... *F16H 53/06* (2013.01); *F01L 2101/00* (2013.01); *F01L 2103/00* (2013.01); *F01L 2103/01* (2013.01); *F01L 2105/02* (2013.01); *F01L 2107/00* (2013.01); *F02M 2200/80* (2013.01)

(58) Field of Classification Search
USPC ............................... 123/90.48, 90.52, 90.55
See application file for complete search history.

(56) References Cited

FOREIGN PATENT DOCUMENTS

| | | | |
|---|---|---|---|
| EP | 2607636 | A1 | 6/2013 |
| WO | 2010139663 | A1 | 12/2010 |
| WO | 2013119214 | A1 | 8/2013 |

MECHANICAL SYSTEM FORMING A CAM FOLLOWER OR A ROCKER ARM, INJECTION PUMP OR VALVE ACTUATOR COMPRISING SUCH A MECHANICAL SYSTEM AND METHOD FOR MANUFACTURING SUCH A MECHANICAL SYSTEM

CROSS REFERENCE TO RELATED APPLICATIONS

This is a Non-Provisional patent application, filed under the Paris Convention, claiming the benefit of Europe (EP) Patent Application Number 14306908.6, filed on 27 Nov. 2014 (27.11.2014), which is incorporated herein by reference in its entirety.

TECHNICAL FIELD OF THE INVENTION

The invention concerns a mechanical system, forming a cam follower or a rocker arm, and comprising a pin or a roller. The invention also concerns an injection pump or a valve actuator comprising such a mechanical system. Finally, the invention concerns a method for manufacturing such a mechanical system.

BACKGROUND OF THE INVENTION

Classically, a cam follower comprises at least a tappet, a pin and a roller. The tappet extends along a longitudinal axis, while the pin and the roller are centered on a transversal axis. The tappet is formed with two lateral flanges, delimiting an intermediate gap between them and each comprising a cylindrical bore. The roller is positioned in the intermediate gap, between both flanges and bores. The pin is fitted in the two bores, such that the roller is movable in rotation relative to the pin around its axis. The pin may be caulked, in other words plastically deformed, on both opposite ends to create a mechanical connection by press-fit in the tappet bores.

When the cam follower is in service, the roller collaborates with a cam synchronized with the internal combustion engine camshaft. The rotation of the camshaft leads to a periodic displacement of a piston of the pump that rests against the tappet, to allow fuel to be delivered. The tappet is movable back and forth along the longitudinal axis in a bore belonging to the injection pump, with the cylindrical outer surface of the tappet sliding in this bore. The roller is movable in rotation around its central axis. The body of the tappet is in one piece, made by forging.

As shown by example in EP-A-2 607 636, it is known to provide the tappet with a single piece body equipped with two flanges having holes for supporting the ends of the pin on which the roller is mounted. The holes in the flanges each have a radial recess adapted to receive a plastically deformed radial portion of the caulked end of the pin. For assembling the cam follower, the roller is mounted between the flanges of the tappet. Then, the pin is inserted in the roller, through the holes of the flanges, the ends of the pin being supported by the flanges. Then, the ends of the pin are caulked. A heat treatment is performed to preform the caulking, which is expensive. Due to the caulking, there exist some deformations on the outer diameter of pin, on the tappet flanges and on the outer diameter of tappet, which is unsatisfactory. Moreover, it is complicated and time consuming to develop the parameters of the caulking solution, in particular the load, and a vibrophore test is required.

SUMMARY OF THE INVENTION

The aim of the invention is to provide an improved mechanical system easy to assemble and having a reduced cost.

To this end, the invention concerns a mechanical system forming a cam follower or a rocker arm, the mechanical system comprising:
  a support element,
  a pin extending between two opposite ends along a first axis, and
  a roller mounted on the pin, movable in rotation relative to the pin around the first axis and adapted to roll on a cam,
  The support element further comprises an insert having holding members supporting the pin ends. According to the invention:
    the holding members are provided with cut-outs having a shape complementary to the shape of the pin-ends, for assembling pin with the insert by quarter-turn around the first axis,
    the pin ends each have a flat surface and an external surface, and
    a first dimension of each pin end, measured perpendicularly to the flat surface, between the flat surface and the external surface of the pin end, is higher than half the outer diameter of the pin ends.

Thanks to the invention, the shape of the pin and of the cut-outs of the insert allows assembling easily the pin with the tappet.

According to further aspects of the invention which are advantageous but not compulsory, such a mechanical system may incorporate one or several of the following features:
  The cut-outs of the insert have a truncated disc shape centered on the transversal axis the flat surface and the shape of the pin ends are complementary to the shape of the cut-outs of insert.
  The first dimension of each pin end is less than the width of a flat mouth of the truncated disc shape of the cut-outs, and a diameter of the pin ends is equal to the diameter of the cut-outs of the insert.
  The first dimension of each pin end is less than a length of the flat surface, taken perpendicularly to transversal axis.
  The mechanical member comprises first axial abutment feature blocking the translation of the pin, in a first direction parallel to a longitudinal axis, the longitudinal axis being perpendicular to the first axis.
  First axial abutment feature protrudes outside a cavity delimited by the support element and receiving the pin.
  The mechanical member includes second abutment feature blocking the translation of the insert, in a second direction opposite the first direction.
  The second abutment feature includes protrusions made by stamping a cylindrical wall of the support element.
  The insert is made from separate parts.
  The pin comprises a first part extending between the pin ends and having a diameter higher than a diameter of the pin ends.
  A distance, measured between the holding members, parallel to the first axis, is smaller than or equal to a length of the first part of the pin.

Another aspect of the invention concerns an injection pump for a motor vehicle, comprising a mechanical system according to the invention.

Another aspect of the invention concerns a valve actuator for a motor vehicle, comprising a mechanical system according to the invention.

Another aspect of the invention concerns a method for manufacturing such a mechanical system, wherein:
- the roller is fitted around the pin,
- the pin ends are inserted inside the cut-outs with the flat surface of the pin ends parallel to a longitudinal axis perpendicular to the first axis,
- the pin is rotated on 90° around the first axis, with respect to the insert,
- the insert, the pin and the roller are inserted inside the support element.

BRIEF DESCRIPTION OF THE DRAWINGS

The invention will now be explained in correspondence with the annexed figures, as an illustrative example, without restricting the object of the invention. In the annexed figures.

DETAILED DESCRIPTION OF SOME EMBODIMENTS

Figure 1:
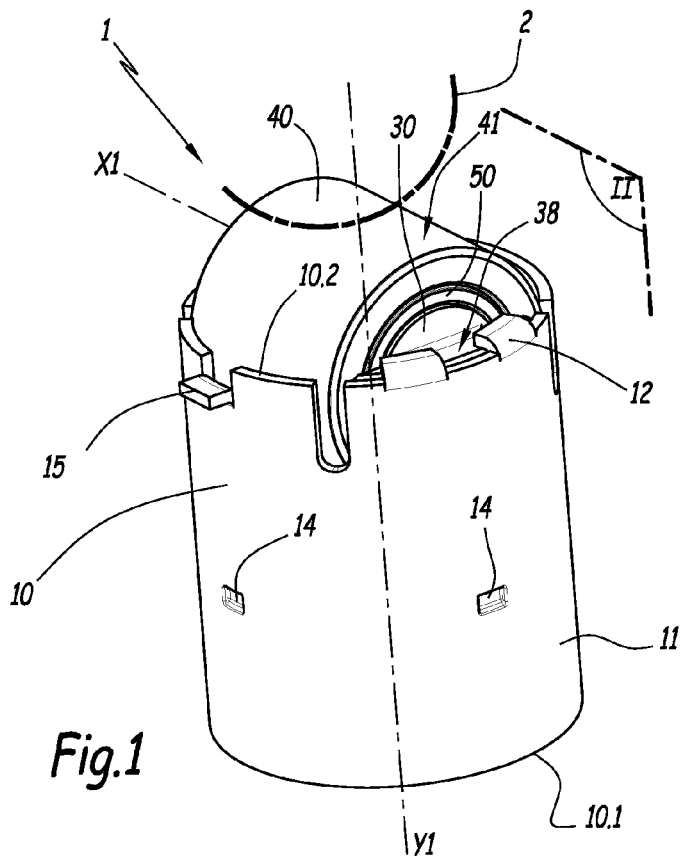
FIG. 1 is perspective view of a mechanical system according to the invention, of the cam follower type.
Figure 2:
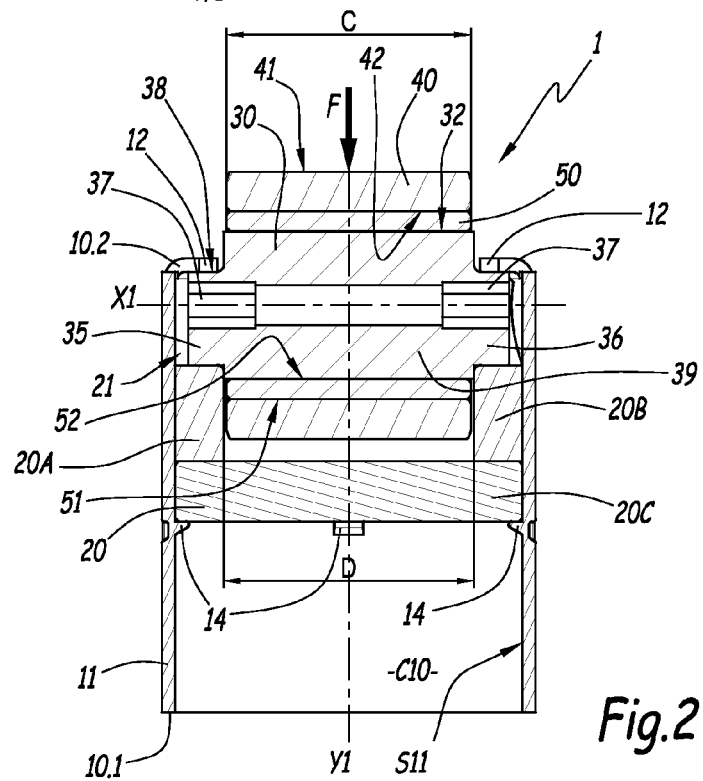
FIG. 2 is a sectional view along plane II on FIG. 1.
Figure 3:
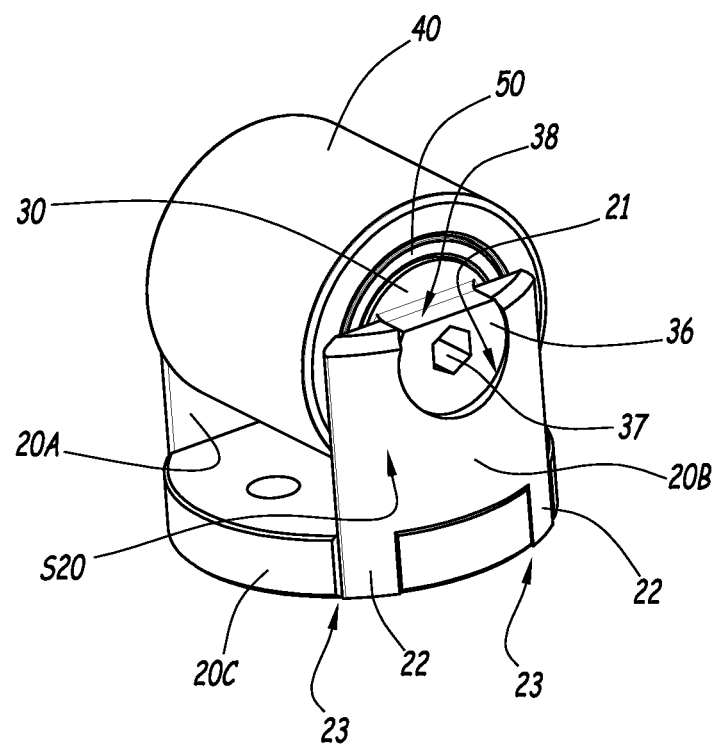
FIG. 3 is a perspective view of a pin assembly of the mechanical system of FIGS. 1 and 2.

The mechanical system 1 represented on FIGS. 1 to 5 is of the cam follower type, adapted to equip an injection pump for a motor vehicle, not shown.

Mechanical system 1 comprises a support element or tappet 10, an insert 20, a pin 30 and a roller 40, together forming a plain bearing. In heavy duty applications such as in diesel truck engines, there is a lack of space for the implementation of a rolling bearing, thus justifying the use of a plain bearing between parts 30 and 40. Pin 30 and roller 40 are centered on a transversal axis X1, while tappet 10 is centered on a longitudinal axis Y1 of mechanical system 1. Axes X1 and Y1 are perpendicular and they have a point of intersection P1. Roller 40 is adapted to roll on a cam 2, partly shown on FIG. 1 only, in centerline. More precisely, an external surface 41 of roller 40 can roll on the outer surface of cam 2. When cam 2 and roller 40 are cooperating, a force F is applied on surface 41 along longitudinal axis Y1.

A cavity C10 is delimited inside tappet 10. This cavity C10 is adapted to receive a shaft or plunger, not shown, for moving tappet 10 along axis Y1. Tappet 10 is movable back and forth along axis Y1, in a non-represented bore belonging to the injection pump.

Tappet 10 has a cylindrical wall or skirt 11 centered along longitudinal axis Y1, with a first end or lower end 10.1, on the side of plunger, and a second end or upper end 10.2 on the side of pin 30 and roller 40. An internal surface S11 of cylindrical wall 11 delimits cavity C10.

Roller 40 has an internal cylindrical bore 42, centred on transversal axis X1. Pin 30 comprises a cylindrical outer surface 32 extending between pin ends 35 and 36 having a truncated disc shape. Surface 32 is adjusted with bore 42 of roller 40, such that roller 40 is movable in rotation relative to pin 30 around axis X1. Both pin 30 and roller 40 axes are centred on transversal axis X1. Pin 30 comprises a first part 39 extending between pin ends 35 and 36, this part having a diameter higher than the diameter D30 of pin ends 35 and 36.

A bushing 50 is located at the interface between pin 30 and roller 40. Bushing 50 has an outer cylindrical surface 51 and an inner cylindrical bore 52. During assembly of system 1, surface 51 of bushing 50 is adjusted with bore 42 of roller 40, while surface 32 of pin 30 is adjusted with bore 52 of bushing 50, such that roller 40 is movable in rotation relative to pin 30 around transversal axis X1. Pin 30, roller 40 and bushing 50 axes are centered on axis X1.

Insert 20 is made from three separate parts and includes a first holding portion 20A and a second holding portion 20B generally parallel with longitudinal axis Y1, and a connecting portion 20C perpendicular to holding portions 20A and 20B.

Each holding portion 20A and 20B is provided with a cut-out 21, for receiving an end 35 or the other 36 of pin 30, having a truncated disc shape. Cut-outs 21 are centered on transversal axis X1.

Holding portions 20A and 20B have a convex external surface S20 curved like a portion of cylinder, centered on longitudinal axis Y1, having a diameter roughly equal to the diameter of internal surface S11 of tappet 10.

Each holding portion 20A and 20B includes several legs 22 protruding towards lower end 10.1 of tappet 10, for example two legs. Each leg 22 if fitted into a corresponding notch 23 of connecting portion 20C.

Connecting portion 20C is a flat disc perpendicular to longitudinal axis Y1, having a diameter roughly equal to the diameter of internal surface S11 of tappet 2010.

Ends 35 and 36 of pin 30 are provided with a tool cooperation member 37, for example a hexagonal socket. The upper part 38 of pin ends 35 and 36 is flat, so the pin ends 35 and 36 have a shape complementary to the shape of the cut-outs 21 of insert 20. Each of the pin ends has an external surface which is cylindrical and of arcuate base. The arcuate shape of this external surface is centered on the axis X1 and forms a portion of the perimeter of the concerned pin end 35 or 36, with the flat surface 38, which forms the remaining portion. In other words, pin ends 35 and 36 have a truncated disc shape, or in other words a truncated cylinder shape.

A first dimension A of each pin end 35 and 36, measured perpendicularly to the flat surface 38, between the flat surface 38 and the external surface of pin end 35 and 36 at a location furthest from flat surface 38, is less than a length B of the flat surface 38, measured perpendicularly to transversal axis X1.

The first dimension A is higher than half the outer diameter D30 of pin ends 35 and 36. The outer diameter D30 corresponds to the diameter of the arcuate external surface.

A distance D, measured inside the cavity C10 between holding portions 20A and 20B, perpendicularly to longitudinal axis Y1, is equal to a length C of the first part 39 of pin 30, taken along transversal axis X1. The distance D is preferably measured parallel to the axis X1.

The first dimension A is roughly equal to, but preferably slightly smaller than the width W21 of the flat mouth of the truncated disc shape of cut-outs 21. The diameter D30 of pin ends 35 and 36 is slightly higher than the diameter D21 of cut-outs 21, in order to obtain a press-fit between parts 20A, 20B and 30. In order to increase the strength of the press-fit, distance D can be strictly smaller than length C.

These relations between dimensions A, B, C, D, D21, W21 and D30 allow pin 30 to be mounted in insert 20.

Pin 30 can be made by sintering or forging, when metallic. As a variant, pin 30 is made of a synthetic material and is overmoulded with a steel insert on its outer diameter.

Tappet 10 is provided with tabs 12 protruding outside of cavity C10, above upper end 10.2 of tappet 10. Tabs 12 form first axial abutment feature. Tabs 12 are external with respect to cavity C10. Each pin end 35 and 36 is blocked by two tabs 12 extending on one side and another of transversal axis X1. For example, tabs 12 are made by bending a portion of tappet 10.

Between each pair of tabs 12, upper end 10.2 of tappet 10 is provided with an anti-rotation member 15 for blocking the rotation of tappet 10 when it is fitted in a cylinder. Anti-rotation member 15 is formed by a tab which extends radially outwardly with respect to wall or skirt 11.

For manufacturing mechanical member 1, roller 40 and bushing 50 are fitted around pin 30.

Then, connecting portion 20C is assembled to holding members 20A and 20B by fitting legs 22 of holding members 20A and 20B inside notches 23 of connecting portion 20C.

Figure 4:
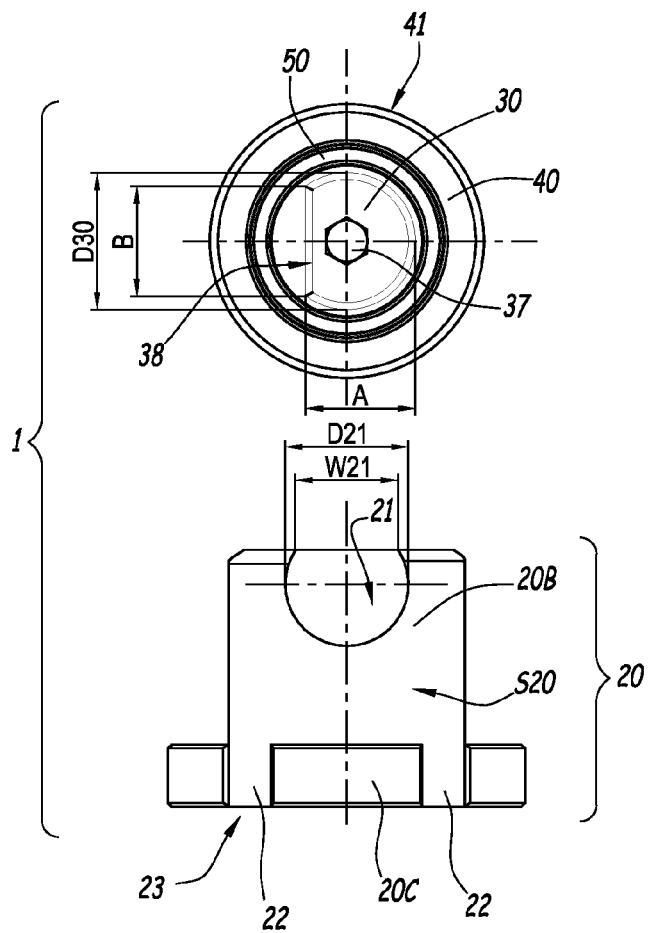
FIG. 4 is a side view of the pin assembly during assembly.
Figure 5:
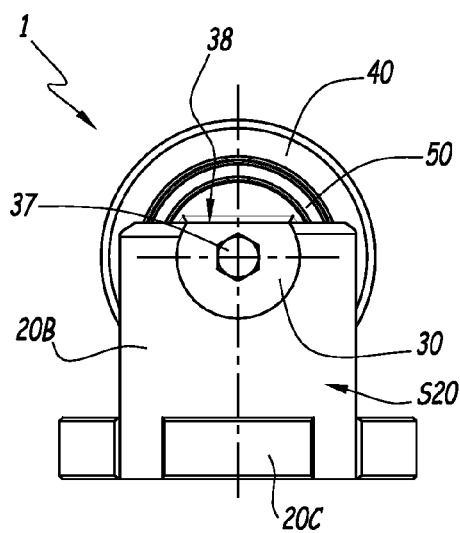
FIG. 5 is a side view of the pin assembly assembled.

Pin ends 35 and 36 are inserted inside cut-outs 21 with the flat surface 38 of pin 30 parallel to longitudinal axis Y1, as shown on FIG. 4.

Then, by means of a tool cooperating with socket 37, pin 30 is rotated on 90° around transversal axis X1 with respect to insert 20, until flat surface 38 of pin 30 is perpendicular to longitudinal axis Y1 and faces away from connecting portion 20C. Then, one reaches the configuration of FIG. 5. As the flat mouth of cut-outs 21 is smaller than the diameter D30 of pin ends 35 and 36, the translation of pin 30 along longitudinal axis Y1, with respect to insert 20, is blocked in the two opposite directions. Thus, pin 30 is assembled with insert 20 by quarter-turn.

Optionally, a stamping operation can be performed at the top of cut-outs 21, in order to avoid the rotation of pin 30 with respect to insert 20. As a variant, the stamping operation is replaced by the implementation of an adhesive.

Then, a pin assembly formed by insert 20, pin 30, roller 40, and bushing 50 is inserted inside tappet 10 until it comes into abutment against tabs 12 of tappet 10.

Then, when insert 20 is already fitted inside tappet 10, protrusions 14 are made by stamping the wall or skirt 11.

In a first direction, from lower end 10.1 of tappet 10 towards upper end 10.2, the translation of pin 30 along longitudinal axis Y1 is blocked by tabs 12 of tappet 10. Thus the first direction is parallel to the longitudinal axis Y1.

In a second direction opposite the first direction, from upper end 10.2 of tappet 10 towards lower end 10.1, the translation of pin 30 along longitudinal axis Y1 is stopped by second axial abutment feature formed by protrusions 14 protruding inside cavity C10.

The cylindrical wall or skirt 11 of tappet 10 forms retaining feature for blocking the translation of pin assembly 20, 30, 40, 50 along transversal axis X1.

The mechanical member 1 is easy to assemble. The weight of tappet 10 is light, and the process to assemble mechanical member 1 is simple, thus the time of development is short, and the investment is relatively cheap.

The cut-outs 21 of insert 20 are rigid, and undergo low stresses. Pin 30 and tappet 10 do not undergo deformations. Therefore, it is easy to control the bearing clearance.

Once the assembly is made, mechanical member 1 can be heat treated.

In a non-depicted variant, bushing 50 is eliminated or replaced by another type of bearing or sliding element, such as needle roller bearings with plastic cage, used for injection pumps for gasoline engines.

Other non-show embodiments can be implemented within the scope of the invention. For example, support element or tappet 10 may have a different configuration, depending on the intended application of mechanical system 1.

Moreover, the mechanical system 1 according to the invention is not limited to a cam follower. For example, system 1 may form a rocker arm, wherein the support element 10 is an arm movable in rotation along a pivot axis parallel to axis X1.

The assembly of the pin 30 with insert 20 by quarter turn can be made by cooperation of shapes different from truncated disc shapes.

In addition, technical features of the different embodiments can be, in whole or part, combined with each other. Thus, mechanical systems can be adapted to the specific requirements of the application.

What is claimed is:

1. A mechanical system forming one of a cam follower or a rocker arm, the mechanical system comprising:
   a support element having first and second support element axial ends and a longitudinal axis, the support element having a cylindrical skirt with an internal surface defining a cavity;
   at least one tab disposed on the first support element axial end and extending radially inwardly therefrom;
   a pin extending between two opposite pin ends along a first axis; and
   a roller mounted on the pin, movable in rotation relative to the pin around the first axis and adapted to roll on a cam, the roller protruding from the first support element axial end;
   an insert disposed within the support element, the insert having an outer insert surface configured to slidingly abut the internal surface of the support element, the insert having a plurality of holding members supporting the two opposite pin ends such that the pin is entirely supported by the insert, the at least one tab overlaps a portion of the insert and of the pin to prevent the insert and the pin from moving linearly along the longitudinal axis past the first support element axial end;
   the internal surface of the support element further comprising at least one protrusion extending into the cavity, the at least one protrusion abutting an end of the insert to prevent the insert, and the pin supported by the insert, from moving linearly along the longitudinal axis past the at least one protrusion such that the insert is restrained between the at least one protrusion and the at least one tab;
   wherein the plurality of holding members are provided with a plurality of cut-outs having a cut-out shape complementary to a cross section shape, as taken perpendicular to the first axis, of the two opposite pin ends, for assembling the pin with the insert by a quarter-turn of the pin around the first axis,
   the cross section shape of each of the two opposite pin ends have a flat surface and an external surface, and
   a first dimension of each of the two opposite pin ends, measured perpendicularly to the flat surface, between the flat surface and the external surface, is higher than half an outer diameter of the two opposite pin ends.

2. The mechanical system according to claim 1, the plurality of cut-outs of the insert further include a truncated disc shape centered on the first axis and in that the flat surface and the cross section shape of the two opposite pin ends are complementary to the shape of the plurality of cut-outs of the insert.

3. The mechanical system according to claim 2, wherein the first dimension is less than a width of a flat mouth of the truncated disc shape of the plurality of cut-outs, and
in that a diameter of each of the two opposing pin ends is equal to a diameter of the plurality of cut-outs of the insert.

4. The mechanical system according to claim 2, wherein the first dimension is less than a length of the flat surface, taken perpendicularly to the first axis.

5. The mechanical system according to claim 1, further comprising the tab blocking the translation of the pin, in a first direction parallel to a longitudinal axis, the longitudinal axis being perpendicular to the first axis.

6. The mechanical system according to claim 5, further comprising the tab protruding outside the cavity delimited by the support element and receiving the pin.

7. The mechanical system according to claim 5, further comprising the at least one protrusion blocking the translation of the insert, in a second direction opposite the first direction.

8. The mechanical system according to claim 7, the at least one protrusion being made by stamping a cylindrical wall of the support element.

9. The mechanical system according to claim 1, wherein the insert is made from separate parts.

10. The mechanical system according to claim 1, the pin further comprising a first part extending between the two opposite pin ends and having a pin diameter greater than a diameter of the two opposite pin ends.

11. The mechanical system according to claim 10, wherein a distance, measured between the plurality of holding members, parallel to the first axis, is one of smaller than or equal to a length of the first part of the pin.

12. The mechanical system according to claim 1, wherein the mechanical system is integrated into an injection pump for a motor vehicle.

13. The mechanical system according to claim 1, wherein the mechanical system is integrated into a valve actuator for a motor vehicle.

14. A method for manufacturing a mechanical system, comprising the steps of:
assembling the mechanical system of claim 1,
the roller is fitted around the pin,
the two opposite pin ends are inserted inside the cut-outs with the flat surface of the two opposite pin ends parallel to a longitudinal axis perpendicular to the first axis,
the pin is rotated on 90° around the first axis, with respect to the insert,
the insert, the pin and the roller are longitudinally inserted inside the support element.

15. The mechanical system of claim 1, wherein the pin does not extend into the cylindrical skirt nor through the peripheral skirt of the support element.

16. The mechanical system of claim 1, wherein the cross section of the two opposite pin ends includes only a single flat surface.

17. The mechanical system of claim 1, wherein there is no gap between the two opposite pin ends and the plurality of cut-outs.

* * * * *